United States Patent
Kimura (10) Patent No.: US 10,783,413 B2
(45) Date of Patent: Sep. 22, 2020

(54) IMAGE FORMING APPARATUS FOR USING A PASSWORD IN CHANGING A SETTING OF AN INTERPRETER

(71) Applicant: CANON KABUSHIKI KAISHA, Tokyo (JP)

(72) Inventor: Hiromi Kimura, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/416,980

(22) Filed: May 20, 2019

(65) Prior Publication Data
US 2019/0362204 A1    Nov. 28, 2019

(30) Foreign Application Priority Data
May 25, 2018 (JP) ................... 2018-101006

(51) Int. Cl.
*G06F 3/12*     (2006.01)
*G06K 15/02*    (2006.01)

(52) U.S. Cl.
CPC ....... *G06K 15/1882* (2013.01); *G06K 15/181* (2013.01); *G06K 15/1807* (2013.01); *G06K 15/1809* (2013.01); *G06K 15/1848* (2013.01); *G06K 15/1886* (2013.01)

(58) Field of Classification Search
None
See application file for complete search history.

(56) References Cited

U.S. PATENT DOCUMENTS

| 2013/0242334 A1* | 9/2013 | Ichida | G06F 21/608 358/1.14 |
| 2016/0004483 A1* | 1/2016 | Yamakawa | G06F 3/1285 358/1.14 |

FOREIGN PATENT DOCUMENTS

JP    2002140177 A    5/2002

* cited by examiner

*Primary Examiner* — Henok Shiferaw
(74) *Attorney, Agent, or Firm* — Canon U.S.A., Inc., I.P. Division (57) ABSTRACT

An information processing apparatus to communicate with an external apparatus includes a reception unit, an execution unit, a setting unit, and a determination unit. The reception unit receives data described in Postscript® from the external apparatus. The execution unit executes processing based on a command described in the data received by the reception unit. The setting unit performs a predetermined setting regarding execution of the processing. The determination unit determines, in a case where the reception unit receives data in which a command associated with a superexec operator is described, whether the execution unit executes the processing based on the command using the predetermined setting.

18 Claims, 7 Drawing Sheets

```
1.   %!PS-Adobe-3.0
2.
3.   /myPassword (abc) def              % VALUE OF Password TO BE SET
4.   /myMaxFontCache 2220011 def        % VALUE OF MaxFontCache TO BE SET
5.
6.
7.   % setSystemParameters
8.          {
9.                        <<
10.                                    /MaxFontCache myMaxFontCache
11.                       >> setsystemparams
12.              } 1183615869 internaldict /superexec get exec
13.
14.
15.  %%% ---Page Size
16.  /pageWidth 595 def
17.  /pageHeight 842 def
18.
19.  <</PageSize [pageWidth pageHeight]>> setpagedevice
20.
21.  0.0 0.3 0.0 0.0 setcmykcolor
22.  0 0 pageWidth pageHeight rectfill
23.
24.  showpage
25.  %EOF
```

IMAGE FORMING APPARATUS FOR USING A PASSWORD IN CHANGING A SETTING OF AN INTERPRETER

BACKGROUND OF THE INVENTION

Field of the Invention

The present disclosure relates to an information processing apparatus, a method for an information processing apparatus, and a storage medium.

Description of the Related Art

Among conventional information processing apparatuses such as a multi-function peripheral, there is an information processing apparatus that incorporates a Page Description Language (PDL) interpreter for interpreting a rendering command described in PDL into a language that can be understood by the information processing apparatus (see Japanese Patent Application Laid-Open No. 2002-140177). In a PostScript® (PS) interpreter, which is one of the PDL interpreters, various parameters for controlling an operation of the PS interpreter can be set by executing a control operator (control command). A user of an external apparatus such as a personal computer (PC) designates a control operator and transmits the control operator described in PS from the external apparatus, so that the PS interpreter can execute the control operator. An example of the parameter is "MaxFontCache", which is used to set a memory amount to be used as a font cache.

For example, to change a value of "MaxFontCache" of the PS interpreter to 3500000 bytes, it is necessary to cause the PS interpreter to execute the following control operator.
<</MaxFontCache 3500000/Password (xxxx)>> setsystemparams In a case where a password is set to the PS interpreter as a PS language specification, it is necessary to designate the password to change the parameter of the PS interpreter. For example, to change the value of "MaxFontCache" in the case where a password is set to the PS interpreter as in the example described above, it is necessary to designate the password set to the PS interpreter by setting "/Password" in the control operator. If the designated password is different from the password set to the PS interpreter, the PS interpreter does not execute the control operator.

On the other hand, in the PS language specifications, there is a superexec operator, which is an operator to change the value of a parameter without designating a password even in the case where a password is set to the PS interpreter. For example, the PS interpreter is caused to execute the control operator associated with the superexec operator. This makes it possible to change the value of "MaxFontCache" of the PS interpreter without a need for designating a password.

If a user who has logged in to the information processing apparatus incorporating the PS interpreter with an administrator authority sets a password to the PS interpreter, the password set by the user is invalidated by the superexec operator. In other words, even if the user has set a password to the PS interpreter, if a third-party user who does not know the password uses the superexec operator, the third-party user can cause the PS interpreter to execute the control operator without designating the password.

SUMMARY OF THE INVENTION

The present disclosure is directed to a mechanism to set whether an information processing apparatus incorporating a PS interpreter can execute a superexec operator.

According to an aspect of the present disclosure, an information processing apparatus to communicate with an external apparatus, the information processing apparatus comprising a reception unit configured to receive data described in Postscript® from the external apparatus, an execution unit configured to execute processing based on a command described in the data received by the reception unit, a setting unit configured to perform a predetermined setting regarding execution of the processing, and a determination unit configured to determine, in a case where the reception unit receives data in which a command associated with a superexec operator is described, whether the execution unit executes the processing based on the command using the predetermined setting.

Further features of the present disclosure will become apparent from the following description of embodiments with reference to the attached drawings.

DESCRIPTION OF THE EMBODIMENTS

Embodiments of the present disclosure will be described below with reference to the accompanying drawings. Configurations described in the embodiments below are merely examples, and the present disclosure is not limited to the configurations illustrated in the drawings.

Figure 1:
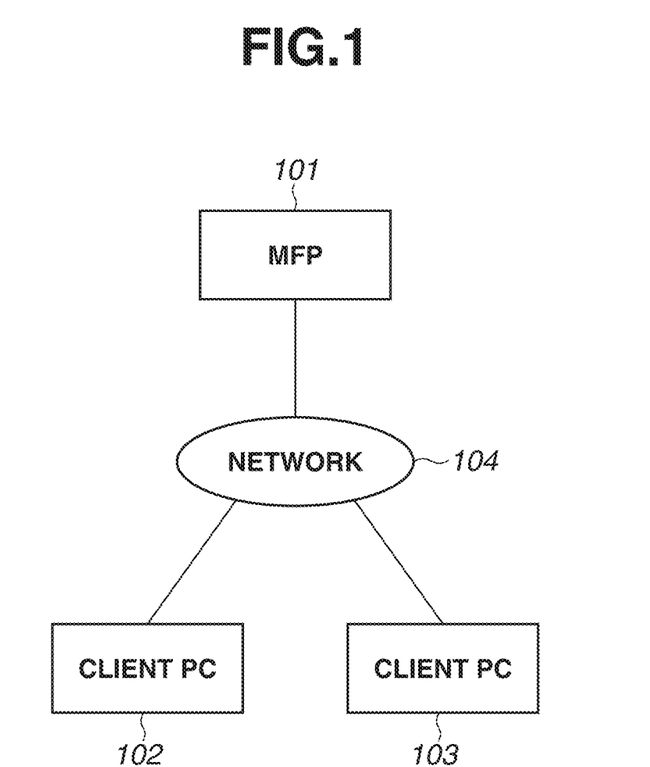
FIG. 1 is a block diagram illustrating an example of a system including a multi-function peripheral (MFP).

FIG. 1 is a block diagram illustrating an example of a system including a multi-function peripheral (MFP) according to an embodiment of the present disclosure.

The system illustrated in FIG. 1 includes an MFP 101, which is an information processing apparatus, and client personal computers (PCs) 102 and 103, which are external apparatuses. The MFP 101 is connected with the client PCs 102 and 103 via a network 104 so that the MFP 101 and the client PCs 102 and 103 can communicate with each other.

The MFP 101 is described as an example of the information processing apparatus according to the present embodiment. However, the information processing apparatus according to the present embodiment is not limited to this example. For example, the information processing apparatus may also be a single-function apparatus such as a single-function peripheral (SFP), or a print control apparatus such as an external controller.

Each of the client PCs 102 and 103 is described as an example of the external apparatus according to the present embodiment. However, the external apparatus according to the present embodiment is not limited to these examples, and may also be a mobile terminal such as a smartphone and a tablet. In the present embodiment, the client PC 102 is used as an example of the external apparatus. However, the client PC 103 can also perform processing similar to that performed by the client PC 102.

The client PC 102 transmits a Page Description Language (PDL) job described in PDL to the MFP 101 via the network 104.

The network 104 may be formed of a wired local area network (LAN) such as Ethernet®, or may be formed of a wireless LAN. Alternatively, the network 104 may be formed of a universal serial bus (USB) cable.

Figure 2:
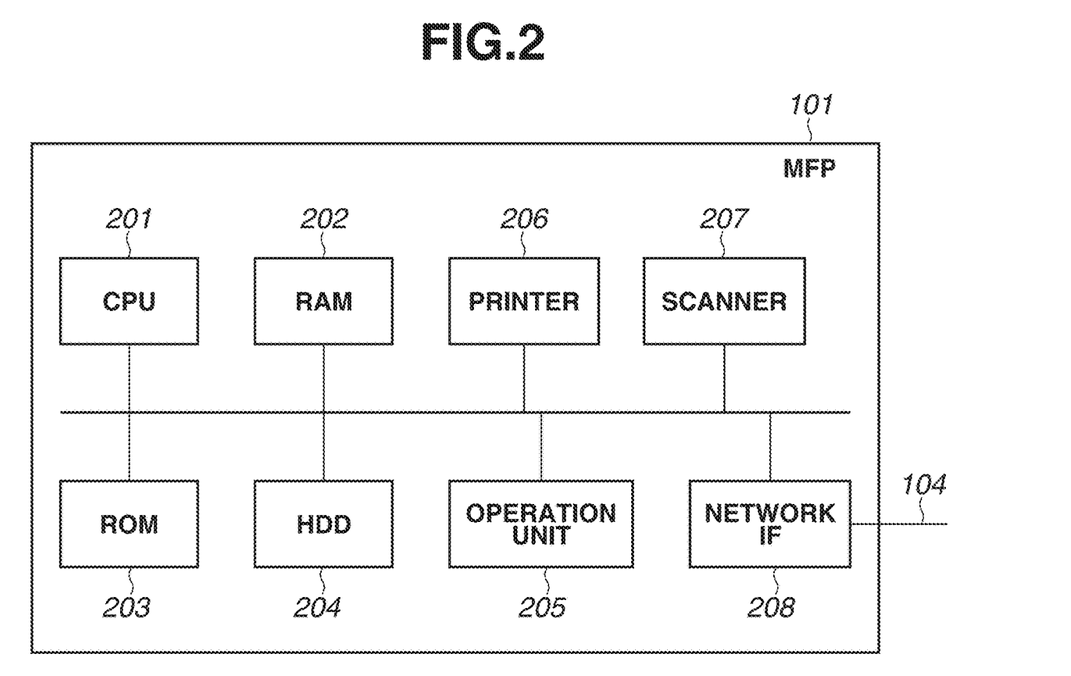
FIG. 2 is a block diagram illustrating a hardware configuration of the MFP.

FIG. 2 is a block diagram illustrating a hardware configuration of the MFP 101. The MFP 101 includes a central processing unit (CPU) 201, a random access memory (RAM) 202, a read-only memory (ROM) 203, a hard disk drive (HDD) 204, an operation unit 205, a printer 206, a scanner 207, and a network interface (IF) 208.

The CPU 201 controls various hardware components 204 to 208 that constitute the MFP 101, to implement functions of the MFP 101. The CPU 201 transmits signals to the hardware components via a bus line and implements mutual data communication with the hardware components.

The CPU 201 of the MFP 101 controls an operation of the MFP 101 based on a control program stored in the MFP 101. More specifically, the CPU 201 executes an operating system (OS) for controlling the MFP 101 and a driver program for controlling the hardware components. Application programs located on the OS operate with each other, thereby operating and controlling a function sought by a user. The OS and various programs are stored in the HDD 204, are loaded into the RAM 202, and are executed.

The RAM 202 is a work memory for temporarily storing a program and data used by the CPU 201 to perform calculation. The ROM 203 is a memory for storing a program and various data used by the CPU 201. The HDD 204 is a storage device that stores various data, various programs, and the like.

The operation unit 205 is a user interface for the user to use the MFP 101, such as a touch panel. The operation unit 205 accepts an operation and an input performed by the user. The operation unit 205 can also be used as a display unit that displays information about the MFP 101.

Figure 7:
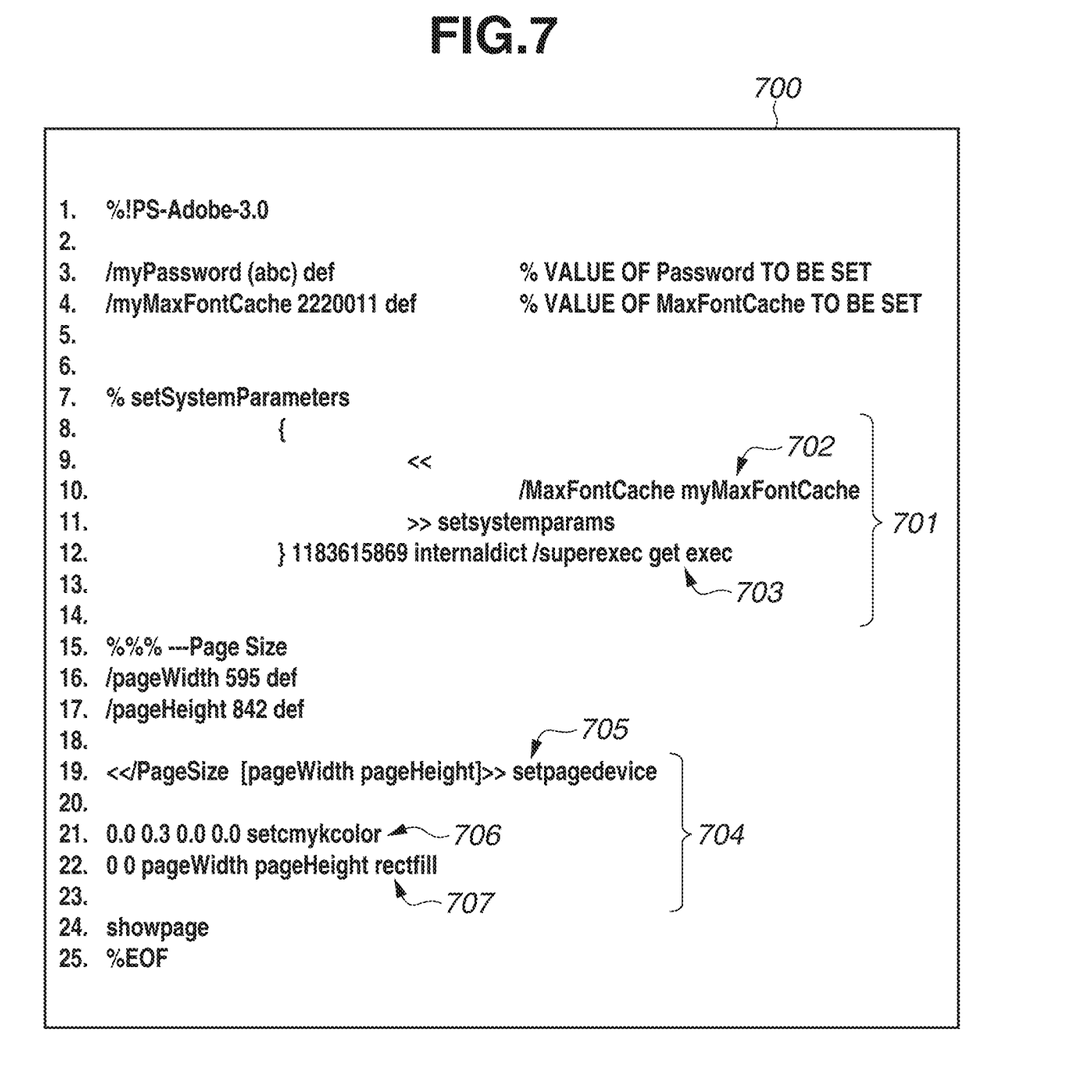
FIG. 7 is a diagram illustrating an example of the PS job.

The printer 206 is a unit that implements a print function. For example, processing for printing an image on a sheet based on, for example, a command described in PostScript® (PS), which is one of the PDLs, is performed from the client PC 102 connected to the network 104. In the present embodiment, a PDL job in which a command for the MFP 101 is described in PS is referred to as a PS job. An example of the PS job is illustrated in FIG. 7. PostScript® (PS) is a computer language that describes the appearance of a printed page in a higher level than an actual output bitmap. In one example, a page description language (PDL) typically used in desktop and electronic publishing may be PostScript® (PS) or a Printer Command Language (PCL).

FIG. 7 is a diagram illustrating an example of a PS job 700.

A command described in the PS job 700 includes a control operator 701 and a rendering operator 704.

The control operator 701 is an operator for changing a parameter of a PS interpreter to be described below.

A setsystemparams operator 702 illustrated in FIG. 7 is used to designate a value of "MaxFontCache", which is a parameter for setting a maximum size of a font cache that can occupy a memory. In this case, in line 4, /myMaxFontCache is defined as 2220011. Thus the value of "MaxFontCache" is 2220011.

A superexec operator 703 is a special operator that causes the PS interpreter, described below, to execute the control operator even if a password to the PS interpreter is not designated in the control operator. For example, as illustrated in FIG. 7, the superexec operator 703 is described in association with the setsystemparams operator 702, whereby the setsystemparams operator 702 can be executed without designating the password. The password to the PS interpreter is also described below.

The rendering operator 704 is an operator for instructing rendering of a character, a figure, and the like.

A setpagedevice operator 705 illustrated in FIG. 7 is used to instruct a size of a page on which rendering is to be performed. In this case, an A4-size page of 595 pixels (width)×842 pixels (height) is designated.

A setcmykcolor operator 706 is an operator for designating colors, based on cyan (C), magenta (M), yellow (Y), and black key (K), used in the page on which the rendering is to be performed.

A rectfill operator 707 is an operator for rendering a square.

The scanner 207 is a unit that implements a scan function. The scanner 207 optically scans a document set on a scanner unit and performs processing for converting scanned data into image data.

The network IF 208 is a network IF for performing wired LAN communication using, for example, Ethernet®. The network IF 208 may also be a network IF for performing wireless LAN communication, a USB-LAN IF, and the like.

Figure 3:
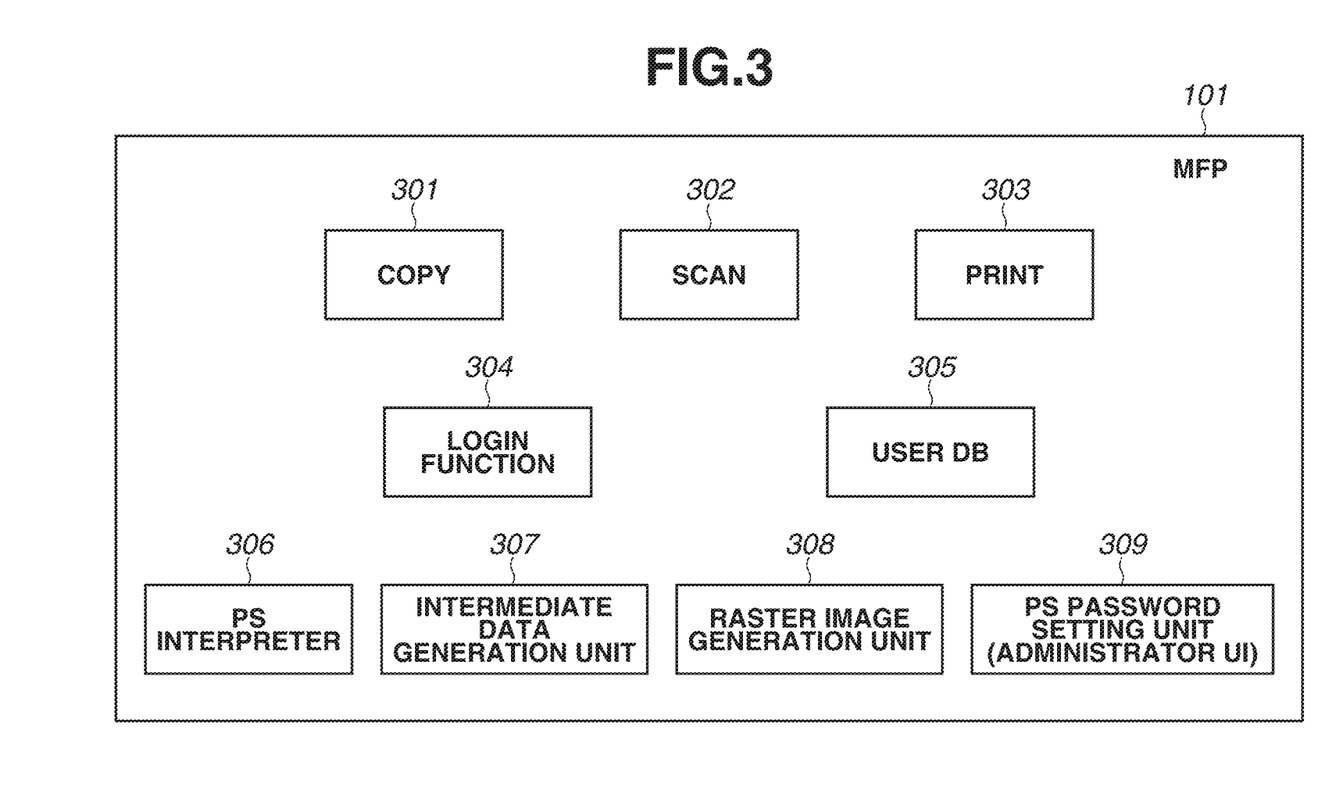
FIG. 3 is a block diagram illustrating an example of a software configuration of the MFP.

FIG. 3 is a block diagram illustrating an example of a software configuration of the MFP 101.

The MFP 101 includes, for example, a copy 301, a scan 302, a print 303, a login function 304, and a user database (DB) 305 as software modules (units) that run on a platform.

The MFP 101 also includes a PS interpreter 306, an intermediate data generation unit 307, a raster image generation unit 308, and a PS password setting unit 309. These software modules are loaded into the RAM 202 from the HDD 204 and are executed by the CPU 201.

The CPU 201 executes the copy 301, the scan 302, or the print 303 to provide a user interface that corresponds to each of the functions and that can be operated by the user.

The CPU 201 executes the login function 304 to provide a function for the user to log in to the MFP 101. Management of a login user, such as registration of a new user and change of user information, is carried out using the user DB 305.

The CPU 201 executes the PS interpreter 306 to interpret the rendering operator based on the control operator included in the PS job received from a print application on the client PC 102 and to convert the operator into an object rendering command, which is in an internal representation format. More specifically, the CPU 201 executes the PS interpreter 306 to change a parameter of the PS interpreter 306 based on the control operator, which is the control command included in the PS job. Examples of the parameter include "MaxFontCache" and "FactoryDefaults". "MaxFontCache" is a parameter for setting the maximum size of the font cache that can occupy the memory. "FactoryDefaults" is a parameter for resetting all parameters that are set to the PS interpreter 306 and stored in a nonvolatile memory to factory default values.

The CPU 201 executes the PS interpreter 306 to convert the rendering operator, which is the rendering command in the PS job, into the object rendering command based on the parameter set to the PS interpreter 306. Examples of the rendering operator include a stroke operator and a rectfill operator. The stroke operator is an operator for rendering a line, and the rectfill operator is an operator for rendering a square.

The following two passwords can be set as passwords to the PS interpreter 306: "SystemParamsPassword" and "StartJobPassword". "SystemParamsPassword" is a password for allowing change of a parameter and execution of a startjob operator. "StartJobPassword" is a password for allowing the execution of the startjob operator.

The startjob operator described herein refers to an operator for resetting a virtual memory and starting a new job.

To change the parameter of the PS interpreter 306, it is necessary to describe "SystemParamsPassword" in the control operator and to cause the PS interpreter 306 to execute the control operator. For example, processing for changing the definition of "MaxFontCache" to 3500000 can be executed by causing the PS interpreter 306 to execute the following operator:
<<MaxFontCache 3500000/SystemParamsPassword>> setsystemparams.

In order to execute the startjob operator in the PS job, it is necessary to describe "SystemParamsPassword" or "StartJobPassword" in the control operator and to cause the PS interpreter 306 to execute the control operator.

To set a password to the PS interpreter 306, it is necessary to describe the currently-set password and a new password in the control operator and to cause the PS interpreter 306 to execute the control operator. For example, "SystemParamsPassword" of the PS interpreter 306 can be changed by causing the PS interpreter 306 to execute the PS job including an operator described below. Similarly, "StartJobPassword" of the PS interpreter 306 can be changed also by causing the PS interpreter 306 to execute the PS job including a similar operator.
<</Password(oldpassword)/SystemParamsPassword(newpassword)>> setsystemparams The password set by the control operator included in the PS job is stored in the RAM 202.

The CPU 201 executes the intermediate data generation unit 307 to generate and output intermediate data in predetermined unit by unit based on the object rendering command. Examples of the predetermined unit includes a page and a specific area (e.g., area having a predetermined width, block having a predetermined size). The intermediate data includes image data representing an image, color information for specifying a color of each object in the image, and edge information for specifying an edge of each object in the image. The intermediate data is data in a format that can be processed by the raster image generation unit 308.

The CPU 201 executes the raster image generation unit 308 to generate a raster image based on the information described in the intermediate data. Thus, the raster image can be generated based on the data described in PS. In the present embodiment, the CPU 201 executes the raster image generation unit 308, which is the software module, to generate the raster image based on the intermediate data. However, the present embodiment is not limited to this example. For example, a raster image processor (RIP), which is a hardware module mounted on the MFP 101, may also generate the raster image based on the intermediate data.

The CPU 201 executes the PS password setting unit 309 to accept a setting of a PS password on a PS password setting screen, which is an example of a screen for an administrator, to be displayed on the operation unit 205. Administrator authority includes authority to generate files and manage operation and use. The screen for the administrator is a screen that is displayed when the user has logged in by an administrator authority and that is displayed on the operation unit 205 when the user has logged in to the MFP 101 through the login function 304 using a user identification (ID) and a password of the administrator.

The processing is described in detail with reference to a flowchart illustrated in FIG. 4. An example of the screen displayed when the processing is executed is illustrated in FIG. 5.

Figure 4:
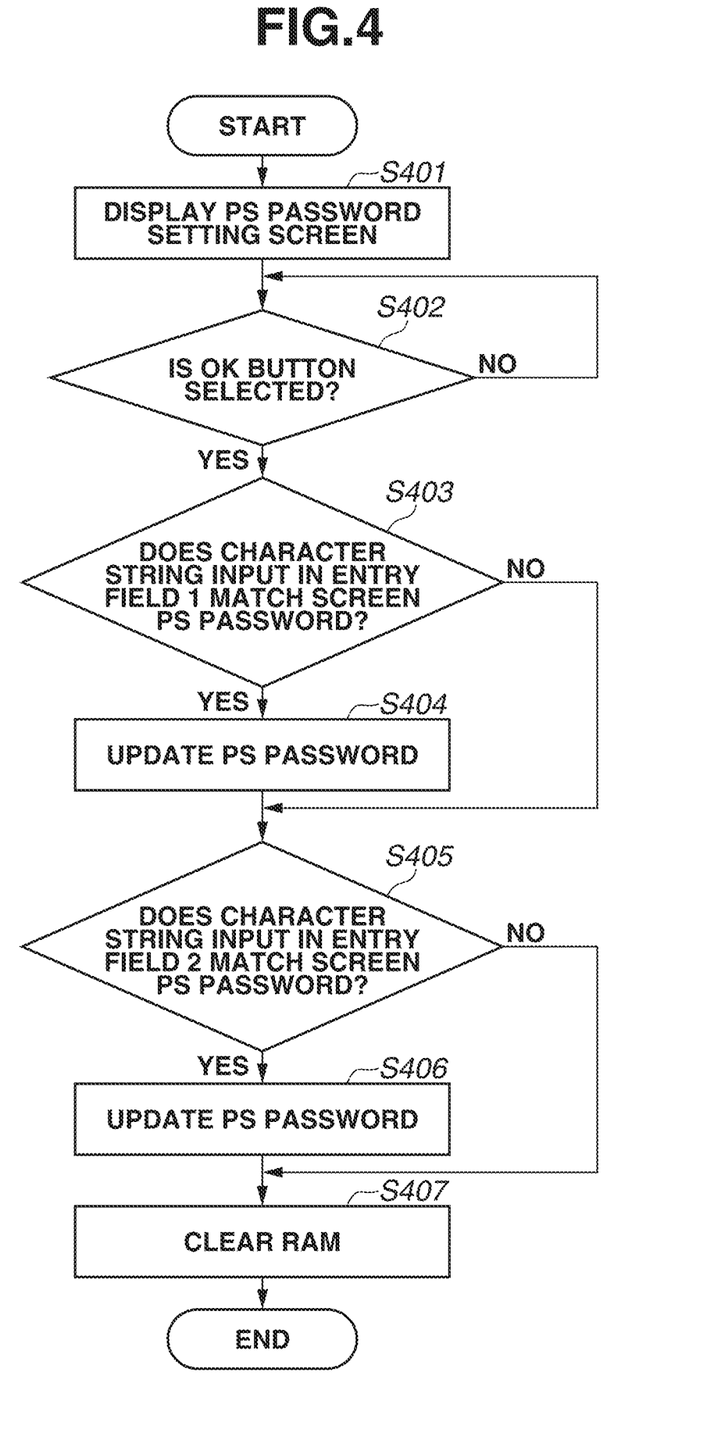
FIG. 4 is a flowchart illustrating an example of Post-Script® (PS) password setting change processing on a screen for an administrator.

FIG. 4 illustrates an example of the flowchart of PS password setting change processing performed on the screen for the administrator. The CPU 201 loads a program stored in the HDD 204 into the RAM 202 and executes the program, thereby implementing the processing in the flowchart illustrated in FIG. 4.

The flowchart is started when the user of the MFP 101 selects a PS password setting screen display button (not illustrated) to change the PS password on the screen for the administrator displayed on the operation unit 205.

Figure 5:
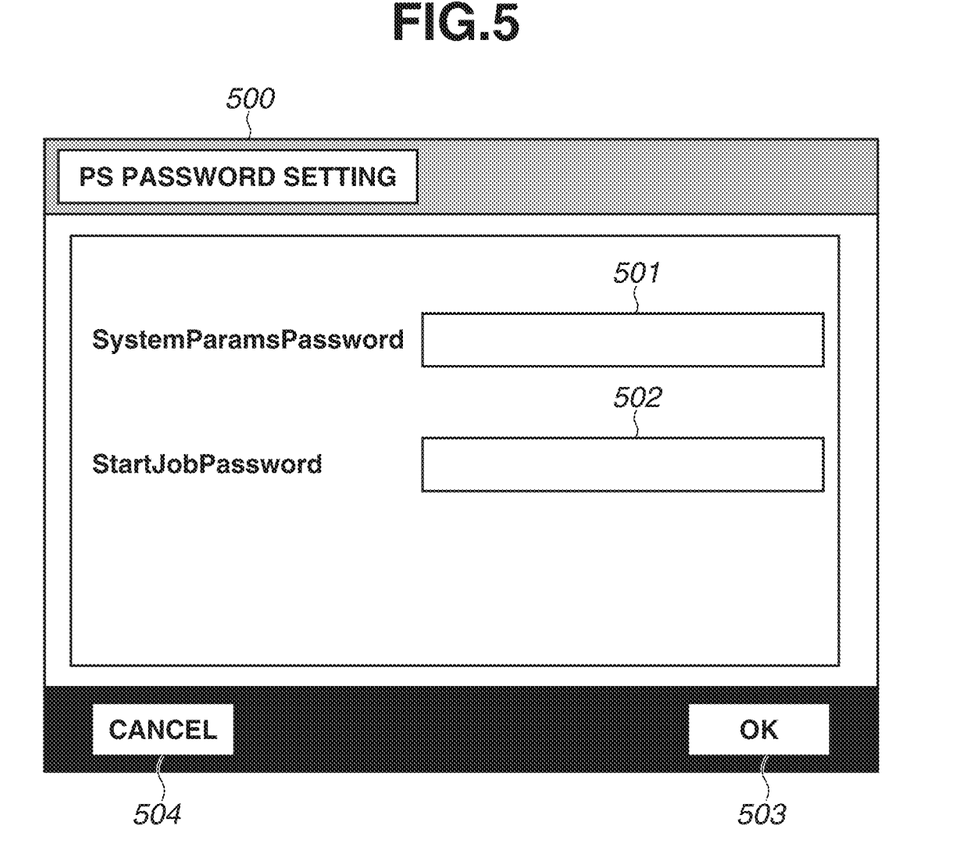
FIG. 5 is a diagram illustrating an example of a PS password setting screen.

First, in step S401, the CPU 201 displays, on the operation unit 205, a PS password setting screen 500 illustrated in FIG. 5 as an example of the PS password setting screen.

FIG. 5 is a diagram illustrating an example of the PS password setting screen 500.

The PS password setting screen 500 is the screen for the administrator that is displayed on the operation unit 205 when the user of the MFP 101 has logged in using the user ID and the password of the administrator. The PS password setting screen 500 is also the screen for accepting the setting of the PS password managed separately from the PS password to the PS interpreter 306 described above with reference to FIG. 3.

Two types of PS passwords, i.e., a PS password to be set by the control operator included in the PS job, and a PS password to be input by the user on the PS password setting screen 500, can be set to the PS interpreter 306 of the MFP 101 according to the present embodiment. Hereinafter, the PS password to be set by the control operator included in the PS job is referred to as a PS password, and the PS password to be input by the user on the PS password setting screen 500 is referred to as a screen PS password. The PS Password is stored in the RAM 202, and the screen PS password is stored in the HDD 204.

An entry field 501 is an entry field for the user to input "SystemParamsPassword".

An entry field 502 is an entry field for the user to input "StartJobPassword".

An OK button 503 is a button for setting an input password. If the OK button 503 is selected by the user, the CPU 201 stores character strings input in the entry fields 501 and 502 into the HDD 204, which is a nonvolatile memory, as passwords. If the OK button 503 is selected in a state where nothing is input in the entry field 501, NULL is stored in the HDD 204 as the value of "SystemParamsPassword". Also, if the OK button 503 is selected in a state where nothing is input in the entry field 502, NULL is stored in the HDD 204 as the value of "StartJobPassword". When the OK button 503 is selected, the CPU 201 closes the PS password setting screen 500.

A cancel button 504 is a button for cancelling the input of a password. If the user selects the cancel button 504, the CPU 201 closes the PS password setting screen 500 without storing the character strings input in the entry fields 501 and 502 into the HDD 204.

In step S402, the CPU 201 determines whether the OK button 503 illustrated in FIG. 5 is selected by the user. If it is determined that the OK button 503 is selected (YES in step S402), the processing proceeds to step S403. If it is determined that the OK button 503 is not selected (NO in step S402), the processing returns to step S402.

In step S403, the CPU 201 determines whether the character string input in the entry field 501 matches "SystemParamsPassword" stored in the HDD 204. If it is determined that the character string input in the entry field 501 matches "SystemParamsPassword" (YES in step S403), the processing proceeds to step S404. If it is determined that the character string input in the entry field 501 does not match "SystemParamsPassword" (NO in step S403), the processing proceeds to step S405. In this case, if nothing is input in the entry field 501, it is determined whether "SystemParamsPassword" stored in the HDD 204 is "NULL". If "SystemParamsPassword" is "NULL", the processing proceeds to step S404. If "SystemParamsPassword" is not "NULL", the processing proceeds to step S405.

In step S404, the CPU 201 stores the character string input in the entry field 501 into the HDD 204, which is a nonvolatile memory, as new "SystemParamsPassword". If nothing is input in the entry field 501, "NULL" is stored in the HDD 204, which is a nonvolatile memory, as the new "SystemParamsPassword".

In step S405, the CPU 201 determines whether the character string input in the entry field 502 matches "StartJobPassword" stored in the HDD 204. If it is determined that the character string input in the entry field 502 matches "StartJobPassword" (YES in step S405), the processing proceeds to step S406. If it is determined that the character string input in the entry field 502 does not match "StartJobPassword" (NO in step S405), the processing proceeds to step S407. If nothing is input in the entry field 502, it is determined whether "StartJobPassword" stored in the HDD 204 is "NULL". If "StartJobPassword" is "NULL", the processing proceeds to step S406. If "StartJobPassword" is not "NULL", the processing proceeds to step S407.

In step S406, the CPU 201 stores the character string input in the entry field 502 into the HDD 204 as new "StartJobPassword". If nothing is input in the entry field 502, "NULL" is stored in the HDD 204, which is a nonvolatile memory, as new "StartJobPassword".

In step S407, the CPU 201 writes "NULL" in an area in which the PS password is stored of the RAM 202, and terminates the processing. In this case, "NULL" is written into both the area in which "SystemParamsPassword" is stored of the RAM 202 and the area in which "StartJobPassword" is stored of the RAM 202. Alternatively, "NULL" may be written into the area in which the PS password corresponding to any of updated "SystemParamsPassword" and "StartJobPassword" is stored.

If the setting of the screen PS password is changed, the MFP 101 according to the present embodiment writes "NULL" in the area in which the PS password is stored of the RAM 202. The reason for this will be described below.

In a case where the screen PS password is set, the MFP 101 according to the present embodiment uses the screen PS password preferentially as a password to the PS interpreter 306. The PS password is used as the password to the PS interpreter 306 in a case where the screen PS password is not set, i.e., in a case where "NULL" is stored as the screen PS password in the HDD 204.

For example, if the user wishes to cause the PS interpreter 306 to execute the control operator without inputting "SystemParamsPassword" to the control operator, the user selects the OK button 503 without inputting any information in the entry field 501. Then, "NULL" is written into the area in which "SystemParamsPassword" is stored of the HDD 204.

However, in a case where, for example, "xxxx" is stored in the RAM 202 as "SystemParamsPassword", "xxxx" is used as "SystemParamsPassword" of the PS interpreter 306. In other words, in a case where the PS password is set, "NULL" is not used as a password by the PS interpreter 306 even if the user sets "NULL" as the screen PS password.

Accordingly, after the screen PS password is set, "NULL" is written into the area in which the PS password is stored of the RAM 202, so that "NULL", which is set as the screen PS password, is also set as the PS password. Thus, if the setting of the screen PS password is changed, the MFP 101 according to the present embodiment writes "NULL" in the area in which the PS password is stored of the RAM 202.

In the present embodiment, if the setting of the screen PS password is changed, "NULL" is written into the area in which the PS password is stored of the RAM 202. However, the present embodiment is not limited to this example. For example, it is also possible to clear the RAM 202 by restarting the MFP 101.

In the present embodiment, the PS password setting screen 500 is displayed on the operation unit 205. However, the present embodiment is not limited to this example. For example, the PS password setting screen 500 may also be transmitted to the client PC 102 as a web page using a web server function of the MFP 101. As a result, the client PC 102 can display the PS password setting screen 500 using a web browser.

As described above, in a case where the screen PS password is set, the screen PS password is preferentially used, so that there is no need to reset the PS password stored in a volatile memory such as the RAM 202 at startup of the MFP 101. Further, since the PS password is reset at the startup of the MFP 101 by performing the above-described processing, it is possible to correct a vulnerability that the PS interpreter 306 can be caused to execute the control operator described in PS without inputting the password.

However, by associating the superexec operator that is a special operator described in PS as illustrated in FIG. 7 with the control operator, the PS interpreter 306 can be caused to execute the control operator without using a password even if the PS password and the screen PS password are set.

More specifically, even if the user sets a password to the PS interpreter 306, a third-party user who does not know the password can use the superexec operator to cause the PS interpreter 306 to execute the control operator without designating a password.

To address this issue, processing described below is performed to allow the MFP 101 incorporating the PS interpreter 306 to prevent the third-party user, who does not know the password to the PS interpreter 306, from causing the PS interpreter 306 to execute the control operator.

Figure 6:
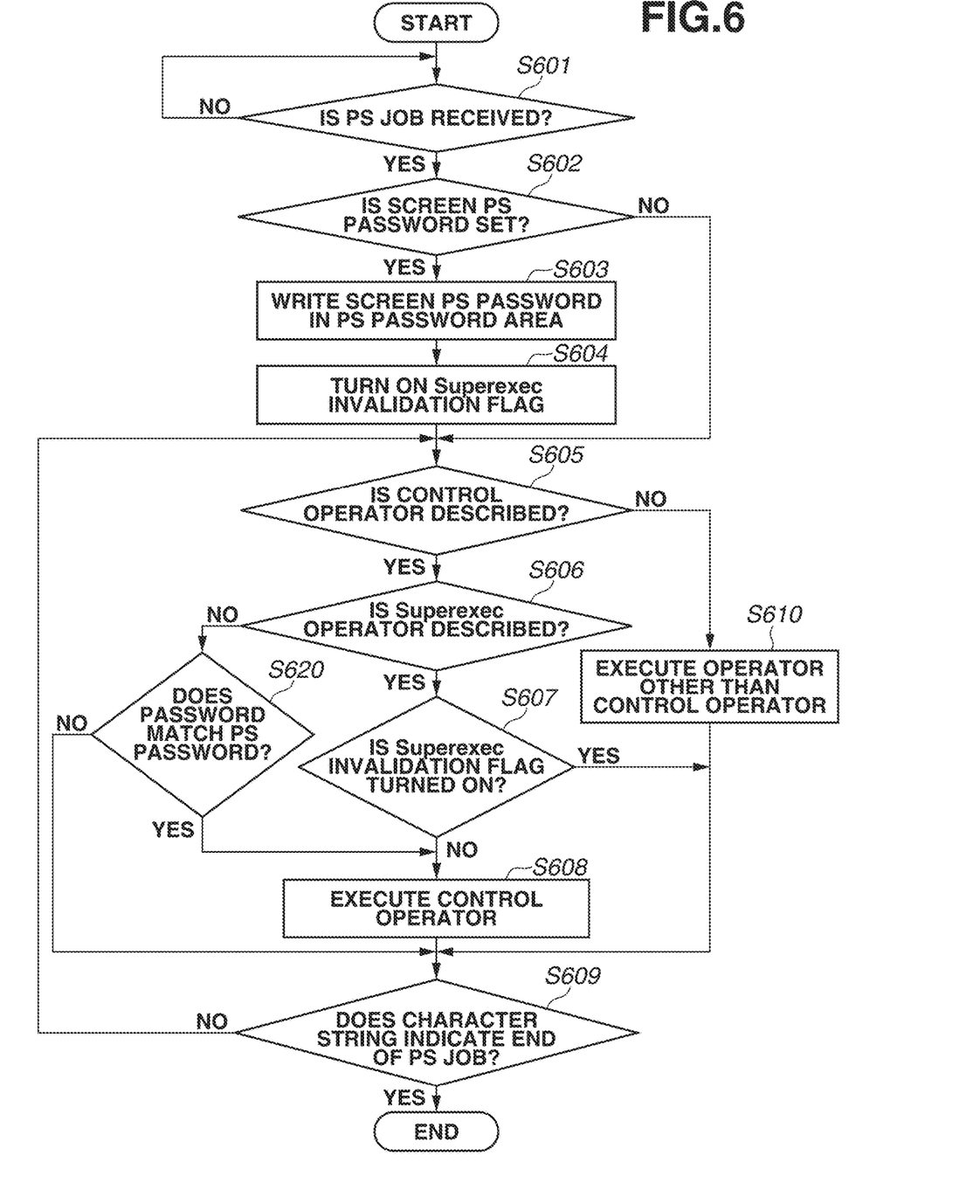
FIG. 6 is a flowchart illustrating an example of processing for invalidating a superexec operator when the MFP executes a PS job.

FIG. 6 is a flowchart illustrating an example of processing for invalidating the superexec operator when the MFP 101 according to the present embodiment executes the PS job. The CPU 201 loads a program stored in the HDD 204 into the RAM 202 and executes the program, thereby implementing the processing in the flowchart illustrated in FIG. 6.

First, in step S601, the CPU 201 determines whether the PS job is received via the network 104. If it is determined that the PS job is received (YES in step S601), the processing proceeds to step S602. If it is determined that the PS job is not received (NO in step S601), the processing returns to step S601.

In step S602, the CPU 201 determines whether the screen PS password is set. More specifically, the area in which the screen PS password is stored of the HDD 204 is checked, and it is determined whether the value in the area is NULL. If the value is not NULL, it can be determined that the screen PS password is set. If the value is NULL, it can be determined that the screen PS password is not set. If it is determined that the screen PS password is set (YES in step S602), the processing proceeds to step S603. If it is determined that the screen PS password is not set (NO in step S602), the processing proceeds to step S605.

In step S603, the CPU 201 writes the screen PS password stored in the HDD 204 in the area in which the PS password is stored of the RAM 202. For example, if the screen PS password is set to "xxxx" on the PS password setting screen 500 and the PS password is set by the control operator, the PS password stored in the RAM 202 is replaced with the screen PS password "xxxx". In this case, both "SystemParamsPassword" and "StartJobPassword" may be replaced, or only "SystemParamsPassword" may be replaced.

In step S604, the CPU 201 turns on a flag for invalidating the superexec operator, which is a special operator. In other words, the CPU 201 determines that the superexec operator is to be invalidated. The flag is temporarily stored in the RAM 202.

The processing of steps S602 to S604 may be started after the PS job is received as in the present embodiment or may be started, for example, at startup of the MFP 101 or when the screen PS password is updated as in steps S404 and S406 illustrated in FIG. 4. In this case, after determining that the screen PS password is not set in step S602 or after the processing of step S604, the CPU 201 performs the processing of step S601 for determining whether the PS job has been received.

In step S605, the CPU 201 determines whether the operator described in the PS job is a control operator. In determining, the CPU 201 interprets each character string line by line from the top of the PS job, and determines whether the operator described in the PS job is a control operator. If it is determined that the operator described in the PS job is the control operator (YES in step S605), the processing proceeds to step S606. If it is determined that the operator described in the PS job is not the control operator (NO in step S605), the processing proceeds to step S610.

In step S606, the CPU 201 determines whether the superexec operator is described in association with the character string interpreted as the control operator. For example, the CPU 201 determines whether the superexec operator is described as below together with the control operator.

```
{
<< /MaxFontCache 3500000 >> setsystemparams
} 1183615869 internaldict /superexec getexec
```

If it is determined that the superexec operator is described as the above (YES in step S606), the processing proceeds to step S607. If it is determined that the superexec operator is not described as the above (NO in step S606), the processing proceeds to step S620.

Referring back to step S605, the case where it is determined that the operator is not the control operator in step S605 will be described. In step S610, the CPU 201 executes an operator other than the control operator. The operator other than the control operator refers to a rendering operator such as a stroke operator for rendering a line and a rectfill operator for rendering a square.

In step S607, the CPU 201 determines whether the flag for invalidating the superexec operator is turned on. In this case, the CPU 201 retrieves a value from the area in which the flag for invalidating the superexec operator is stored of the RAM 202, and determines if the flag is on or off. If it is determined that the flag is on (YES in step S607), the processing proceeds to step S609. If it is determined that the flag is off (NO in step S607), the processing proceeds to step S608.

In step S620, the CPU 201 determines whether the password described together with the control operator matches the PS password stored in the RAM 202. If it is determined that the password matches the PS password (YES in step S620), the processing proceeds to step S608. If it is determined that the password does not match the PS password, the processing proceeds to step S609.

In step S608, the CPU 201 executes the control operator.

In step S609, the CPU 201 determines whether the interpreted character string indicates an end of the PS job. To determine whether the character string indicates the end of the PS job, the CPU 201 determines, for example, whether the interpreted character string is "% EOF". If the character string indicates the end of the PS job (YES in step S609), the processing ends. If the character string does not indicate the end of the PS job (NO in step S609), the character string to be interpreted is shifted to the next line, and the processing returns to step S605.

In the present embodiment, if the screen PS password is set on the screen for the administrator, the processing for invalidating the superexec operator is carried out. However, the present embodiment is not limited to this example. For example, the superexec operator may be invalidated even if the screen PS password is not set ("NULL" is set as the screen PS password), or the superexec operator may be invalidated at all times.

In the present embodiment, to invalidate the superexec operator, the CPU 201 determines whether the screen PS password is set and automatically invalidates the superexec operator. However, the present embodiment is not limited to this example. For example, the superexec operator may be invalidated based on an accepted setting made by the user about whether to invalidate the superexec operator. In this case, the setting made by the user may be accepted on a screen displayed on the operation unit 205 or may be accepted on the web browser of the client PC 102 that has received a web page generated using the web server function of the MFP 101.

In a case where reservation printing is set by the user to the PS job received by the MFP 101 and if the superexec operator is described in the PS job, the CPU 201 may not execute the PS job. More specifically, the CPU 201 prevents the printer 206 from performing the printing based on the PS job in which the reservation printing is set. The PS job may also be deleted.

The example in which the MFP 101 according to the present embodiment invalidates the execution of the operator described together with the superexec operator has been described above. However, the embodiment is not limited to this example. For example, from the time the CPU 201 determines that the superexec operator is described in the PS job, execution of a control operator described subsequent to the control operator (control command) and interpretation of the rendering operator may be cancelled.

As described above, the MFP 101 according to the present embodiment can provide a mechanism to set whether the superexec operator can be executed.

While the present embodiment has been described using the MFP 101 as the example of the information processing apparatus, a PC incorporating a PS interpreter may also be used. If the PC is used as the information processing apparatus, a CPU of the PC executes the PS interpreter and transmits data generated after the execution to the MFP 101, which is an image forming apparatus.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may include one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to embodiments, it is to be understood that the disclosure is not limited to the disclosed embodiments. The scope of the following claims is to be accorded the broadest interpretation so as to encompass all such modifications and equivalent structures and functions.

This application claims the benefit of Japanese Patent Application No. 2018-101006, filed May 25, 2018, which is hereby incorporated by reference herein in its entirety.

What is claimed is:

1. An image forming apparatus including an operation panel and a Postscript® (PS) interpreter configured to be set and to interpret PS data, the image forming apparatus comprising:
a memory storing instructions; and
a processor configured to execute the instructions to perform operations including:
setting a first password received through the operation panel from a setting user or a second password included in received PS data as a password to be required for changing setting of the PS interpreter,
receiving PS data from an external apparatus, and
executing a command included in the received PS data in a case where the received PS data includes an operator that requests an execution of the command regardless of a password match and the second password has been set even if the received PS data does not include a password matched with the set second password, and
not executing the command included in the received PS data in a case where the received PS data includes the operator and does not include a password matched with the set first password, and the first password has been set.

2. The image forming apparatus according to claim 1,
wherein, in a case where a password, received from a user who has logged in based on administrator authority, is set and the received PS data includes the operator, executing includes not executing the command, and
wherein, in a case where the password, received from the user who has logged in based on administrator authority, is not set and the received PS data includes the operator, executing includes executing the command.

3. The image forming apparatus according to claim 2, wherein executing the instructions further performs operations including accepting input of the password received from the user who has logged in based on the administrator authority, and setting the accepted password.

4. The image forming apparatus according to claim 1,
wherein, in a case where invalidating the operator that requests the execution of the command is set based on input received from a user who has logged in based on an administrator authority and the received PS data includes the operator, executing includes not executing the command, and
wherein, in a case where not invalidating the operator that requests the execution of the command is set based on input received from the user who has logged in based on an administrator authority and the received PS data includes the operator, executing includes not executing the command.

5. The image forming apparatus according to claim 4,
wherein executing the instructions further performs operations including accepting, from the user who has logged in based on an administrator authority, an instruction on whether the operator is to be invalidated, and
wherein setting includes using the accepted instruction to set whether to invalidate the operator.

6. The image forming apparatus according to claim 1, wherein, in a case where the received PS data includes the operator and a password included in the command matches the set password, executing includes executing the command.

7. The image forming apparatus according to claim 1, wherein, in a case where executing includes not executing the command, executing includes not executing processing based on a command described subsequent to the command.

8. The image forming apparatus according to claim 1, wherein executing the instructions further performs operations including performing no printing based on the received PS data in a case where executing includes not executing the command and reservation printing is set to the received PS data.

9. The image forming apparatus according to claim 1, wherein the command includes at least a control operator.

10. The image forming apparatus according to claim 1, wherein the operator is an operator to change a value of a parameter without designating a password, even in a case where a password is set to the PS interpreter.

11. The image forming apparatus according to claim 1, wherein the operator that requests the execution of the command regardless of a password match is a superexec operator.

12. The image forming apparatus according to claim 1, wherein the setting of the PS interpreter includes setting of cache area size that the PS interpreter secures.

13. A method for an image forming apparatus including an operation panel and a Postscript® (PS) interpreter configured to be set and to interpret PS data, the method comprising:

setting a first password received through the operation panel from a setting user or a second password included in received PS data as a password to be required for changing setting of the PS interpreter;

receiving PS data from an external apparatus; and executing a command included in the received PS data in a case where the received PS data includes an operator that requests an execution of the command regardless of a password match and the second password has been set even if the received PS data does not include a password matched with the set second password, and not executing the command included in the received PS data in a case where the received PS data includes the operator and does not include a password matched with the set first password, and the first password has been set.

14. The method according to claim 13, wherein the operator that requests the execution of the command regardless of a password match is a superexec operator.

15. The method according to claim 13, wherein the setting of the PS interpreter includes setting of cache area size that the PS interpreter secures.

16. A non-transitory computer-readable storage medium storing a program to cause a computer to perform a method for an image forming apparatus including an operation panel and a Postscript® (PS) interpreter configured to be set and to interpret PS data, the method comprising:

setting a first password received through the operation panel from a setting user or a second password included in received PS data as a password to be required for changing setting of the PS interpreter;

receiving PS data from an external apparatus; and executing a command included in the received PS data in a case where the received PS data includes an operator that requests an execution of the command regardless of a password match and the second password has been set even if the received PS data does not include a password matched with the set second password, and not executing the command included in the received PS data in a case where the received PS data includes the operator and does not include a password matched with the set first password, and the first password has been set.

17. The non-transitory computer-readable storage medium according to claim 16, wherein the operator that requests the execution of the command regardless of a password match is a superexec operator.

18. The non-transitory computer-readable storage medium according to claim 16, wherein the setting of the PS interpreter includes setting of cache area size that the PS interpreter secures.

* * * * *